United States Patent [19]

Caveney et al.

[11] Patent Number: 5,368,261
[45] Date of Patent: Nov. 29, 1994

[54] CABLE MOUNT AND FIXTURE

[75] Inventors: Jack E. Caveney, Hinsdale; Larry A. Hillegonds, New Lenox; James D. Duncan, Tinley Park, all of Ill.

[73] Assignee: Panduit Corp., Tinley Park, Ill.

[21] Appl. No.: 148,172

[22] Filed: Nov. 1, 1993

Related U.S. Application Data

[63] Continuation-in-part of Ser. No. 991,820, Dec. 17, 1992, abandoned.

[51] Int. Cl.⁵ ............................................. F16L 3/00
[52] U.S. Cl. .................................. 248/73; 248/69; 248/74.3; 411/508; 411/913
[58] Field of Search ................. 248/73, 74.3, 69, 68.1; 411/508, 509, 510, 913

[56] References Cited

U.S. PATENT DOCUMENTS

| | | | |
|---|---|---|---|
| 3,087,700 | 4/1963 | Carpenter et al. | 248/74.3 |
| 3,126,185 | 3/1964 | Christman . | |
| 3,154,281 | 10/1964 | Frank . | |
| 3,157,377 | 11/1964 | Orenick . | |
| 3,210,030 | 10/1965 | Ramsey et al. . | |
| 3,423,055 | 1/1969 | Fisher | 248/73 |
| 3,550,219 | 12/1970 | Van Buren, Jr. | 248/73 |
| 3,611,861 | 10/1971 | Schulze | 411/508 |
| 3,632,069 | 1/1972 | Thayer et al. . | |
| 3,632,071 | 1/1972 | Cameron et al. . | |
| 3,651,734 | 3/1972 | McSherry | 411/913 X |
| 3,672,156 | 6/1972 | Fiorentino . | |
| 3,693,494 | 9/1972 | Meyer | 411/508 |
| 3,905,570 | 9/1975 | Nieuwveld . | |
| 3,913,876 | 10/1975 | McSherry . | |
| 4,112,815 | 9/1978 | Tanaka | 248/73 X |
| 4,306,820 | 12/1981 | Nelson . | |
| 4,371,137 | 2/1983 | Anscher | 248/73 |
| 4,427,328 | 1/1984 | Kojima . | |
| 4,779,828 | 10/1988 | Münch | 248/74.3 |
| 4,795,116 | 1/1989 | Kohut et al. . | |
| 4,805,856 | 2/1989 | Nicoli et al. . | |
| 4,919,373 | 4/1990 | Caveney et al. . | |
| 5,228,816 | 7/1993 | Boville | 411/508 X |

FOREIGN PATENT DOCUMENTS 933929  8/1963  United Kingdom ............... 248/74.3

*Primary Examiner*—Alvin C. Chin-Shue
*Assistant Examiner*—Derek J. Berger
*Attorney, Agent, or Firm*—Charles R. Wentzel; Mark D. Hilliard; Robert A. McCann

[57] ABSTRACT

A cable mount for securing a bundle of wires against a mounting surface including a spaced apart pair of legs having retention barbs, and a corresponding harness fixture, which allows for easy application of a single, centered cable tie by an automatic cable tie application tool.

19 Claims, 6 Drawing Sheets

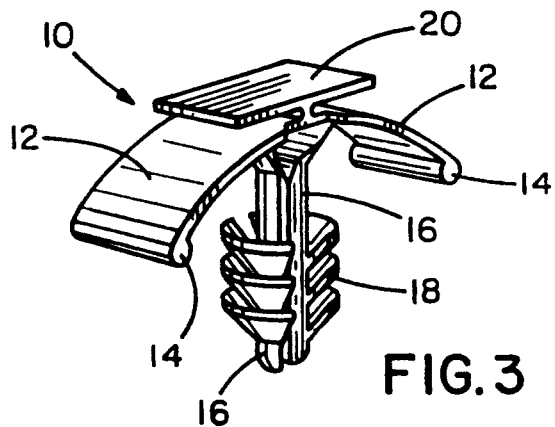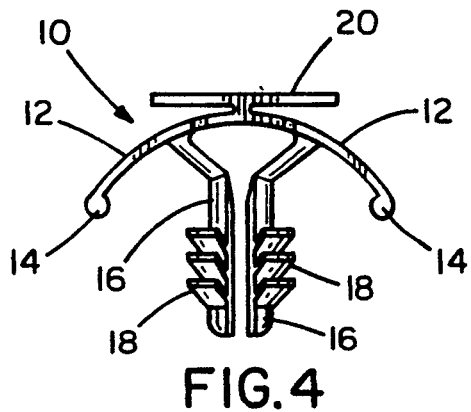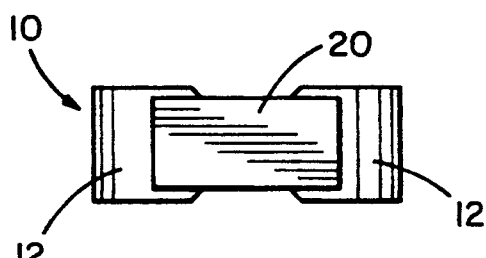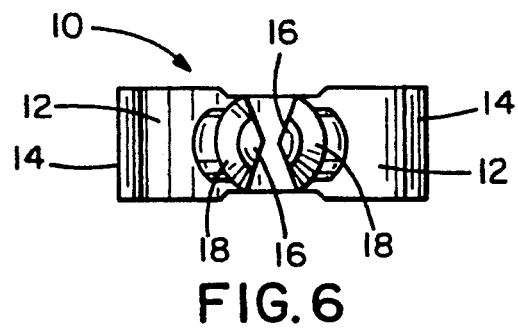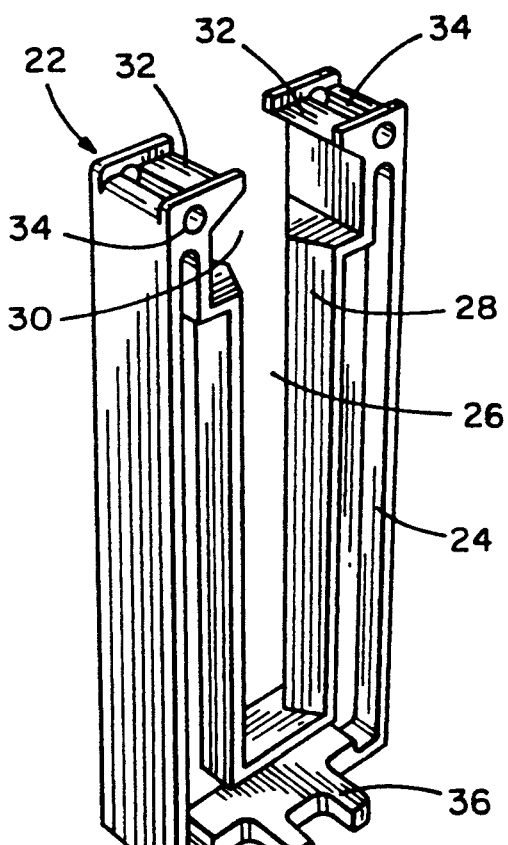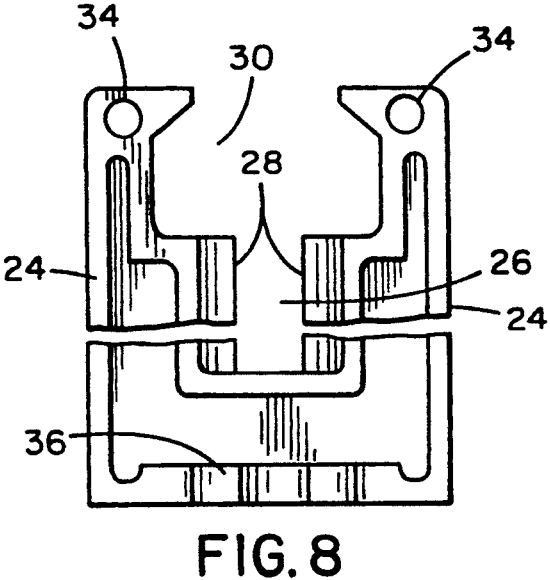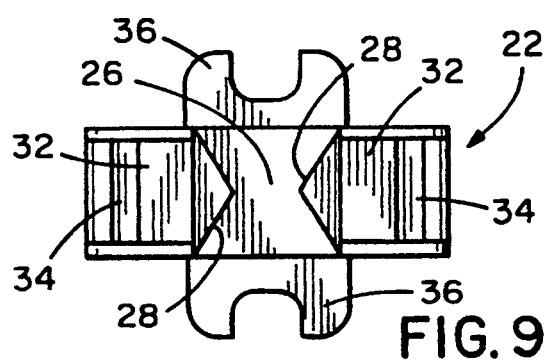

CABLE MOUNT AND FIXTURE

This is a continuation-in-part of application Ser. No. 07/991,820, filed Dec. 17, 1992, now abandoned.

TECHNICAL FIELD

The present invention relates to a cable mount and accompanying fixture, and more specifically to a cable mount which can be secured to a bundle of wires by application of a single cable tie, preferably by an automatic tool, and a fixture for supporting the cable mount during application of the cable tie.

BACKGROUND OF THE INVENTION

There are a wide variety of fasteners and mounts that have been proposed to secure a bundle of wires to a mounting surface. Many of these utilized today, have general features similar to one of the types disclosed in the following commonly assigned U.S. Pat. Nos. 4,919,373, 4,805,856, 3,632,071 and 3,632,069. While each of these types of cable tie mounts possess certain desirable characteristics, they also fail to possess certain desirable characteristics. One major desirable feature that is lacking in all of these types of cable mounts is their inaccessibility to automatic cable tie application systems and tools. It is often desirable to have the ability to use automatic cable tie application tools when using cable mounts, particularly when utilizing a harness board set up. In order for the cable tie mount to be useful, the automatic cable tie application tool must be able to tighten the cable tie around both the bundle of wires and have the tie also be secured to the mount. Furthermore, the mount must be strong enough to secure the bundle to the mounting surface as well as to not collapse under the stresses applied by the automatic cable tie application tool. It is also important to have the bundle balanced on the mount in order to ensure that the mount will be properly secured to the structure.

SUMMARY OF THE INVENTION

It is therefore an object of the present invention to provide a cable tie mount which can be used in conjunction with automatic cable tie application tools.

It is another object of the present invention to provide a cable tie mount that has a pair of spaced apart mount legs between which an automatic cable tie application tool can secure the bundle by application of a single cable tie.

It is a further object of the present invention to provide a cable mount that can hold a bundle of wires by a single centered cable tie.

It is still a further object of the present invention to provide a fixture for supporting the cable mount against a wall, such as a harness board, in such a manner so as to allow application of a single, centered cable tie by an automatic cable tie installation tool.

In general, a cable mount for mounting a bundle of wires to a mounting surface includes a one-piece resilient arcuate body member having a top side and an underside resiliently deformable from a first to a second position, and first and second mounting legs formed on and projecting from the body member such that deformation of the body member to the second position spaces the first and second legs further apart and strap accepting means situated between the first and second mounting legs and the underside of the body member for accepting and seating a cable tie strap to secure the bundle of wires to the top side of the body member.

BRIEF DESCRIPTION OF THE DRAWINGS

FIG. 3 is a perspective view of the cable mount embodying the concept of the present invention;

FIG. 4 is a side view of the cable mount of FIG. 3;

FIG. 5 is a top view of the cable mount of FIG. 3;

FIG. 6 is a bottom view of the cable mount of FIG. 3;

FIG. 7 is a perspective view of a fixture embodying the concept of the present invention;

FIG. 8 is a fragmentary side view of the fixture of FIG. 7;

FIG. 9 is a top view of the fixture of FIG. 7;

DESCRIPTION OF THE PREFERRED EMBODIMENT

Figure 16:
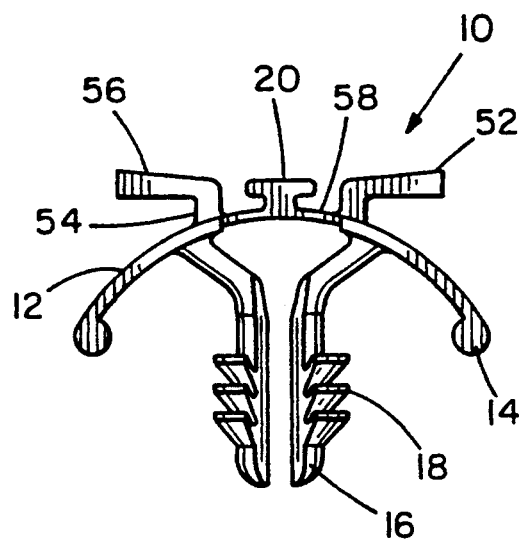
FIG. 16 is a side view of the cable mount of FIG. 15.
Figure 17:
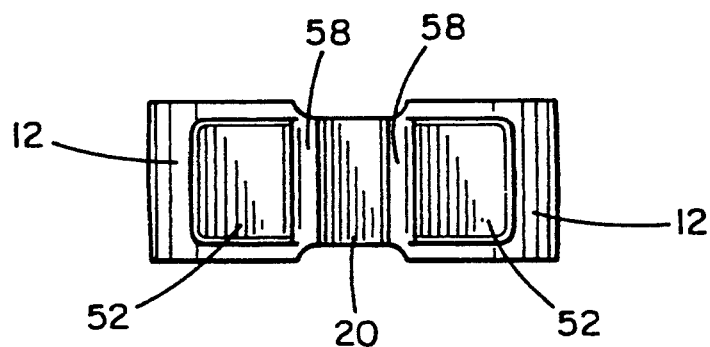
FIG. 17 is a top view of the cable mount of FIG. 15.
Figure 18:
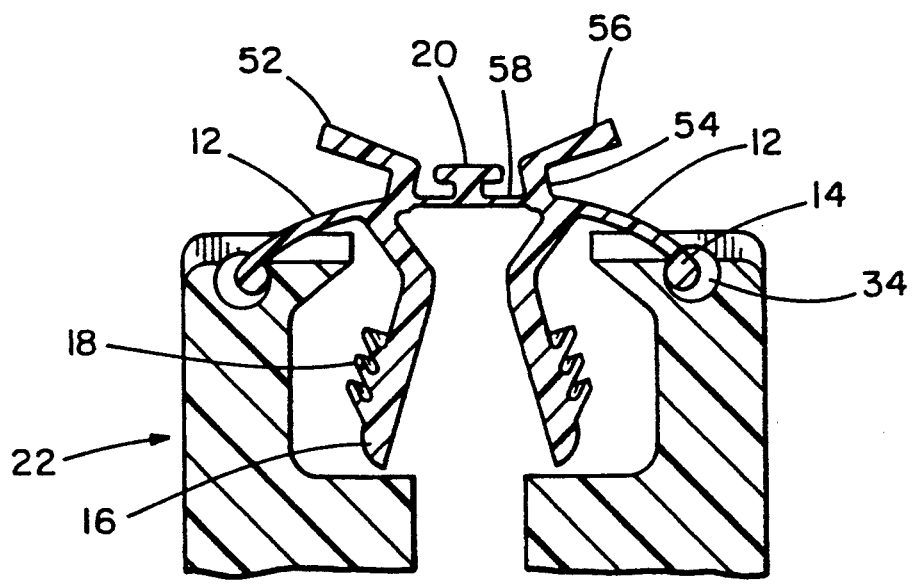
FIG. 18 is a side sectional view of the cable mount of FIG. 15 engaged with the harness fixture of the present invention.
Figure 19:
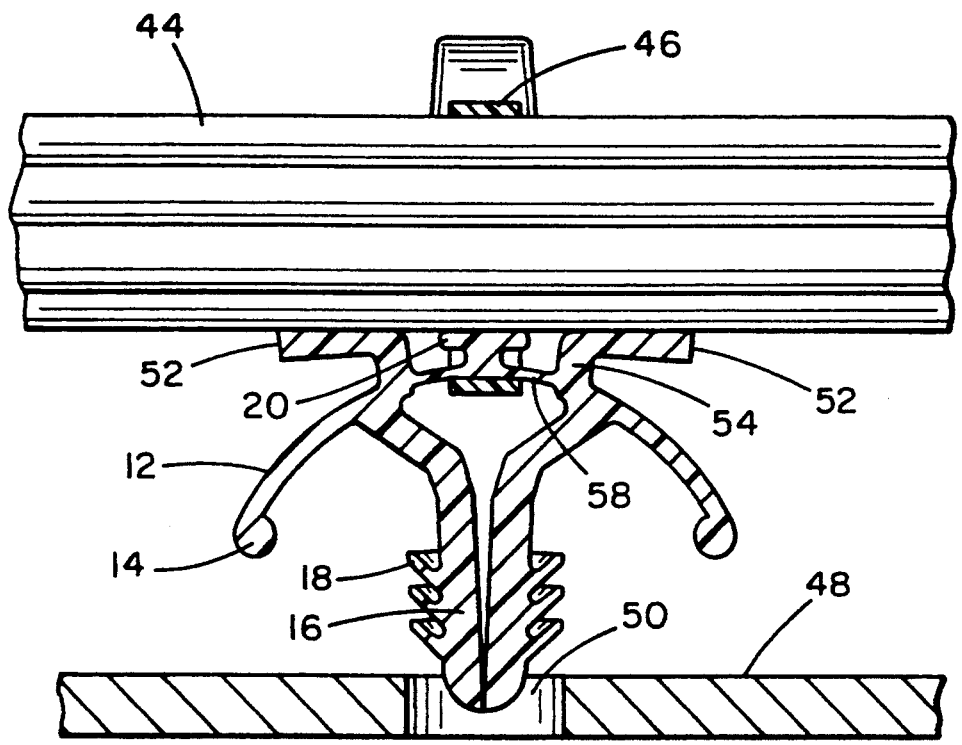
FIG. 19 is a side sectional view of the cable mount of FIG. 15 shown having a bundle of wires secured by a cable tie shown just prior to insertion into the mounting surface.
Figure 20:
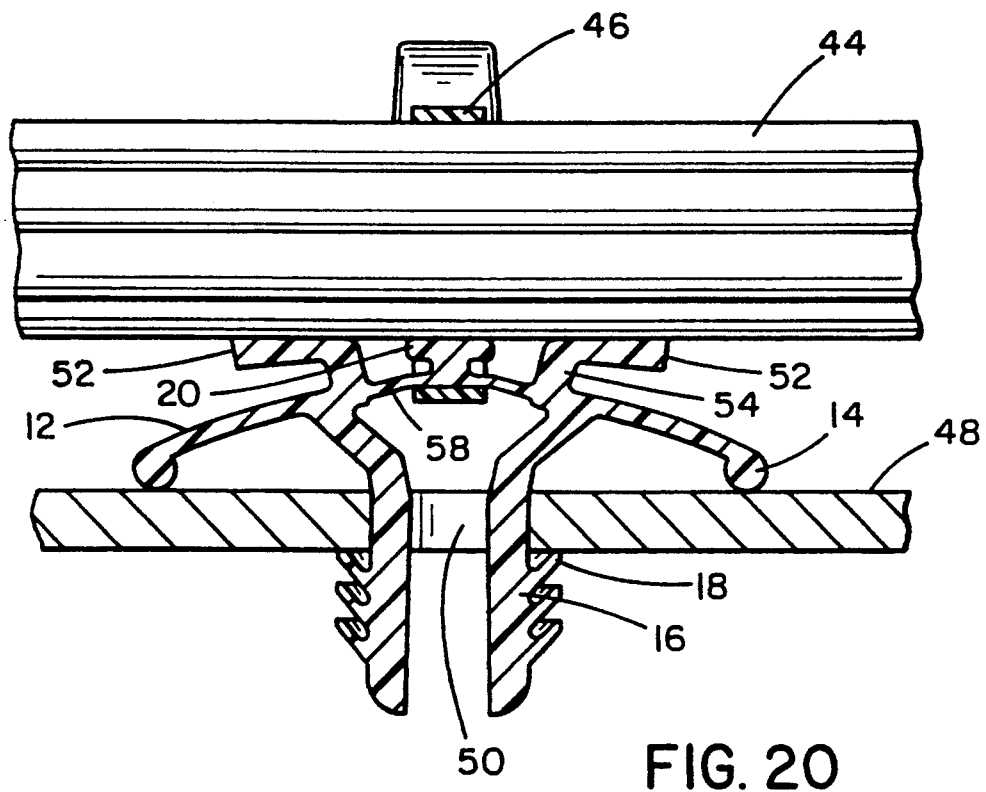
FIG. 20 is a side sectional view of the cable mount of FIG. 15 shown securing a bundle of wires by a cable tie to the mounting surface.

A cable mount embodying the concept of the present invention is designated generally by the reference numeral 10 in the accompanying drawings. Cable mount 10 includes a resilient arcuate body member that is composed of a pair of oppositely extending integral tension arms 12, and a pair of spaced apart legs 16 that extend radially inward from the concave underside of tension arms 12. Each tension arm 12 is resilient and includes a flanged end 14 which is cylindrically shaped. As can be seen in FIG. 4, each leg 16 extends from the underside of one of the tension arms 12 and is initially directed radially inward towards each other. Legs 16 are equidistant from a centerpoint on the arcuate body member and are further shaped to include bends whereby they remain spaced apart, yet become parallel to each other. As also can be seen in FIG. 4, there is a greater distance between legs 16 near the tension arms 12 than below the bend in legs 16. This resulting space is sufficiently large for a cable tie to be inserted in between legs 16. Legs 16 also include a plurality of retention barbs 18 formed as semi-circular, upwardly angled, disc protrusions on the non-opposing sides of legs 16. There is also included a saddle support 20, as seen in FIGS. 3 and 4, attached to the top of tension arms 12 at their centerpoint, which provides a flat surface for the bundle of wires 44 to rest upon, as well as reducing the stress placed on tension arms 12. Another embodiment of cable mount 10 as shown in FIGS. 15–20 shows a pair of bent lever support members 52 disposed on each side of a smaller saddle support section 20 on the top side of body member 12. As best seen in FIGS. 16 and 17, body member 12 also includes a thinner and narrower central portion 58. As can be seen in FIG. 16, each of the bent lever members 52 includes a vertically extending base portion 54 and a planar lever portion 56 extending on a slight incline away from saddle support 20. Each of the bent lever members 52 is disposed at a point on the top side of arcuate body member 12 substantially opposite of where mounting legs 16 project from the underside of body member 12. By having both planar lever portions 56 of bent lever members 52 incline away from each other and saddle support 20, a leg closing force is created when a bundle of wires 44 is tightened and secured to the top of cable mount 10 as shown in FIG. 19. As can be seen in FIG. 18, when cable mount 10 is engaged with harness fixture 22 such that arcuate body member 12 is in its second position with mounting legs 16 spread farther apart, the planar lever portions 56 of bent lever members 52 are at a greater incline relative to saddle support 20. The tightening of bundle 44 around cable mount 10 by a cable tie application tool thus forces planar lever portions 56 into a horizontal position, as shown in FIG. 19. Vertical base portions 52, which are disposed on the body member 12 opposite of mounting legs 16 are thus pressed upon the top side of body member 12 forcing the body member 12 to return to its first position, resulting in the closing together of mounting legs 16. The additional flexibility created by the thinner and narrower central section 58 also enhances the leg closing capabilities of bent lever members 52.

Figure 11:
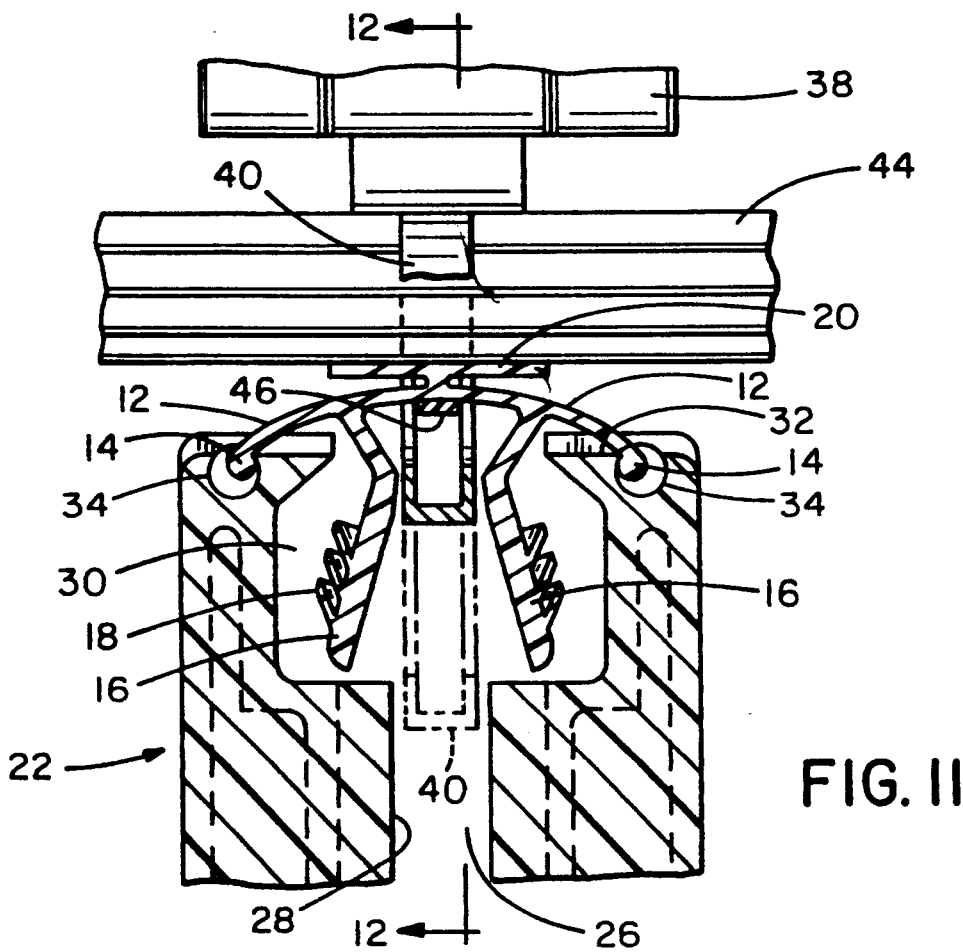
FIG. 11 is a side view of the cable mount and fixture having the cable tie applied by an automatic tool.
Figure 12:
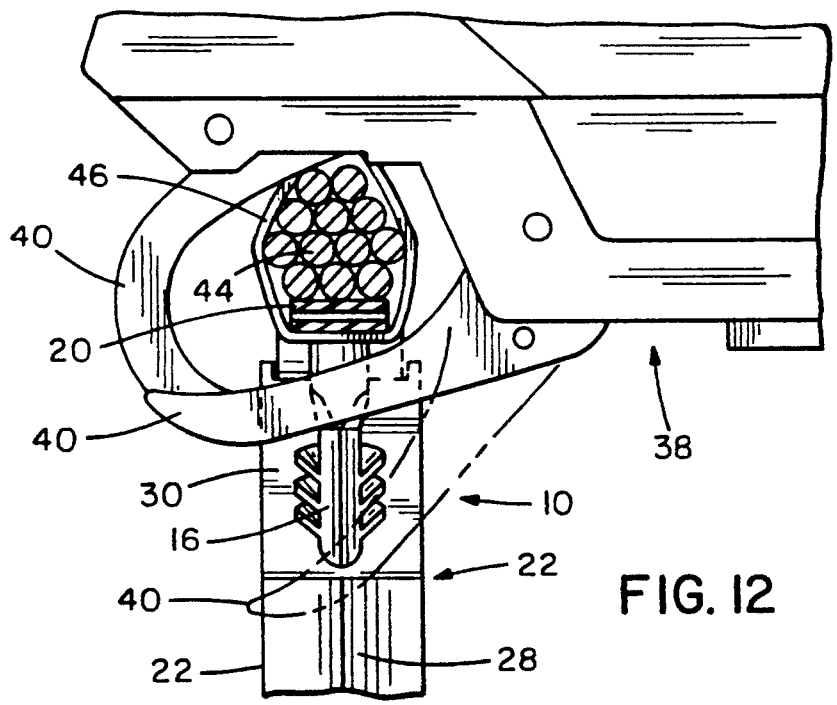
FIG. 12 is a sectional view of the cable mount and fixture having the cable tie applied by the automatic tool, taken along line 12—12 of FIG. 11.

Harness fixture 22, as seen in FIG. 7, includes a base and a pair of spaced apart vertical fixture arms 24 attached to the base, having horizontally planar top guide surfaces 32 at their distal ends. Each top guide surface 32 cooperates with a cylindrical retention hole 34 for engagement with flanged ends 14 of the respective tension arms 12 of cable mount 10. Each fixture arm 24 of harness fixture 22 has a pair of converging central guide surfaces 28 that lead the jaws 40 of an automatic cable tie application tool 38 into a central gap 26 that is created between the spaced apart fixture arms 24. There is a further indented upper gap 30 near the distal ends of fixture arms 24. This upper gap 30 allows for legs 16 of cable mount 10 to spread as they engage with harness fixture 22, which allows for a cable tie 46 to be applied between legs 16 and around cable mount 10 as seen in FIG. 11. The base of harness fixture 22 includes mounting means for securing harness fixture 22 to a harness board such as transversely extending guide slots 36, shown in FIGS. 7 and 9, or a threaded aperture in the base (not shown).

Figure 1:
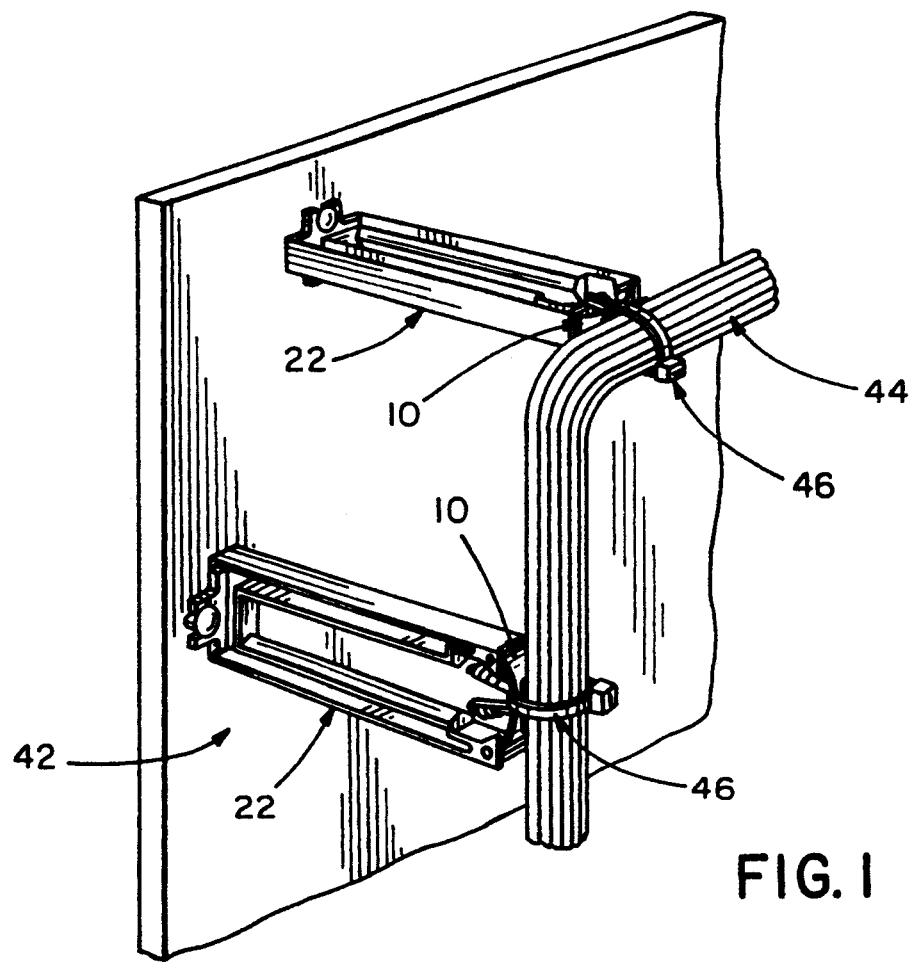
FIG. 1 is a partial perspective view of a harness board set up utilizing cable mounts and fixtures embodying the concept of the present invention.
Figure 2:
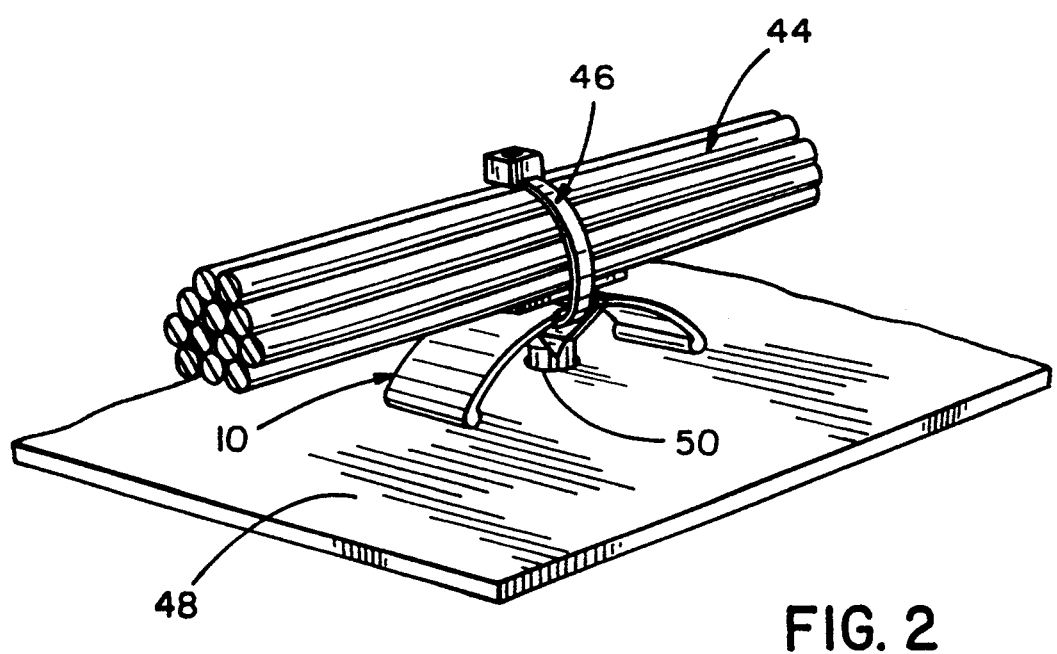
FIG. 2 is a partial perspective view of a cable mount embodying the concept of the present invention shown secured to a bundle by a cable tie and mounted on a surface.
Figure 10:
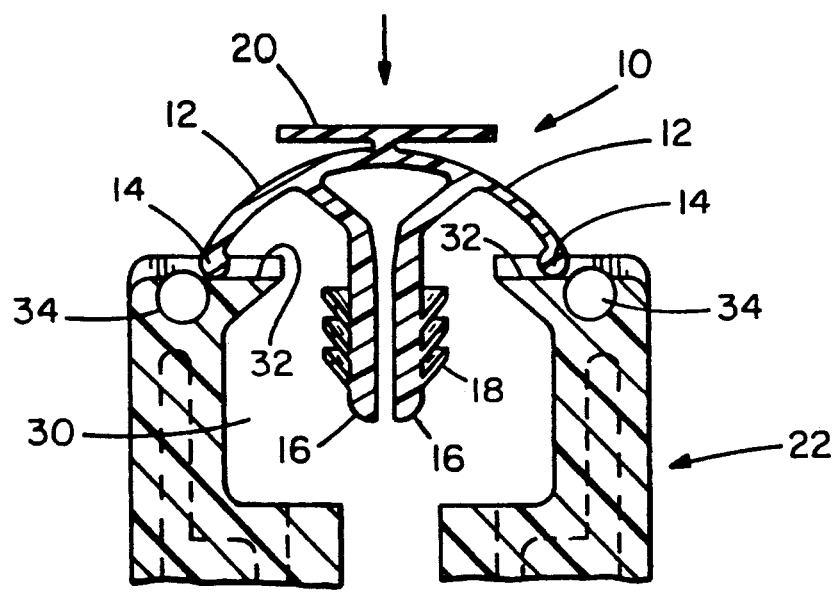
FIG. 10 is a side sectional view of the cable mount and fixture prior to engaging the cable mount to the fixture.

As can be seen in FIG. 10, just prior to engagement with harness fixture 22 the body member of cable mount 10 is in a first non-deformed position and the main portion of legs 16 of cable mount 10 are parallel to each other. When cable mount 10 is pushed into engagement with harness fixture 22, the body member deforms to a second position and tension arms 12 spread out until flanged ends 14 come into engagement with retention pockets 34 to secure cable mount 10 to harness fixture 22. As can be seen in FIG. 11, as tension arms 12 spread out the integrally attached legs 16 are also pulled apart into the extra space of upper indented gap 30. This opening up of legs 16, which occurs when the body member is deformed to its second position, allows for tool jaws 40 of an automatic tool 38 to be inserted between legs 16 so that cable tie 46 can be applied around cable mount 10 and the bundle of wires 44. Central guide surfaces 28 also aid in the application of cable tie 46 around cable mount 10. As best seen in FIG. 11, central guide surfaces 28 direct the tool jaws 40 into central gap 26 so that the cable tie 46 can be applied in between spread legs 16 of cable mount 10.

After cable tie 46 has been applied around cable mount 10 and bundle 44, the mount 10 is removed from harness fixture 22 by rotating the flanged ends 14 out of engagement with retention pockets 34 and is then ready to be secured to a mounting surface 48.

Figure 13:
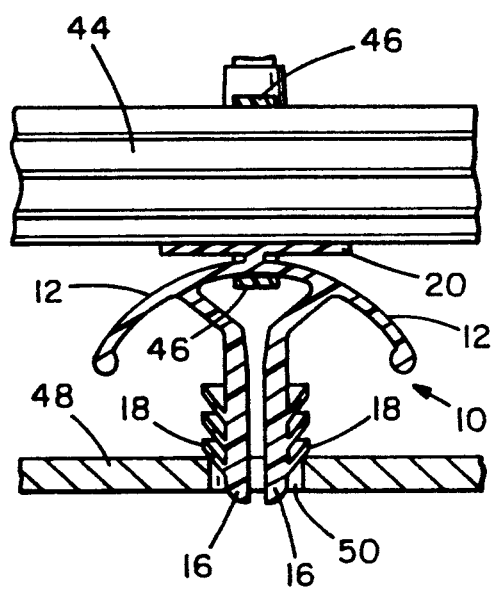
FIG. 13 is a sectional view of the cable mount partially inserted into a hole in a mounting surface.
Figure 14:
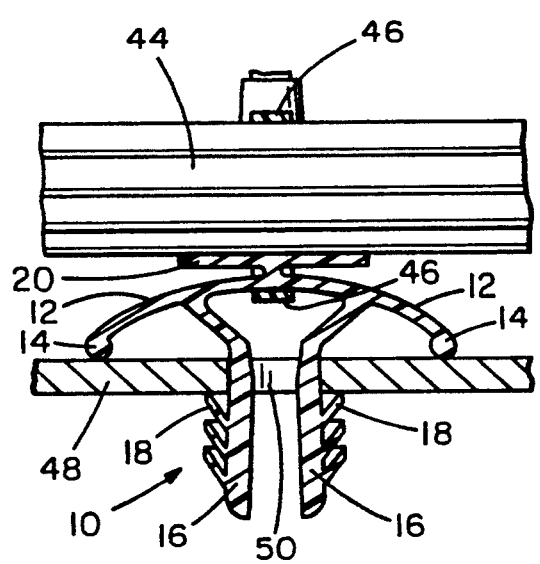
FIG. 14 is a sectional view of the cable mount fully inserted into the hole in the mounting surface.
Figure 15:
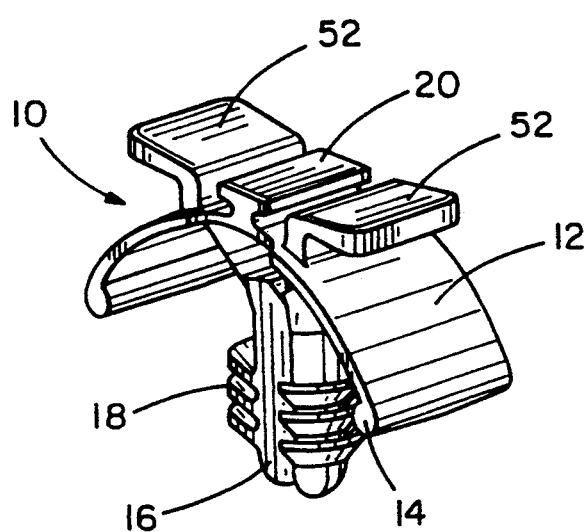
FIG. 15 is a perspective view of a second embodiment of the cable mount of the present invention.

As shown in FIGS. 13 and 14, cable mount 10 is mounted to mounting surface 48 by inserting legs 16 into a mounting hole 50 in the mounting surface 48 until retention barbs 18 are fully through mounting hole 50. Retention barbs 18 are reversely angled and shaped so that they will facilitate the insertion of legs 16 into mounting hole 50, and yet they will prevent the removal of cable mount 10 by abutting the opposing side of the mounting surface 48. Flanged ends 14 of tension arms 12 are pressed against mounting surface 48, and the pressure causes tension arms 12 to spread out slightly thus causing a slight spreading of legs 16 which further secures cable mount 10 to mounting surface 48.

While the particular embodiments of the present invention have been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A cable mount for mounting a bundle of wires to a mounting surface comprising:
   a one-piece resilient arcuate body member having a top side and an underside resiliently deformable from a first to a second position;
   first and second mounting legs formed on and projecting from the underside of the body member such that deformation of the body member to the second position spaces the first and second legs further apart and;
   strap accepting means situated between the first and second mounting legs and the underside of the body member for accepting and seating a cable tie strap to secure the bundle of wires to the top side of the body member.

2. A cable mount in accordance with claim 1 further comprising securing means situated on the mounting legs for securing the cable mount to the mounting surface.

3. A cable mount in accordance with claim 2, wherein the body member is formed as a pair of oppositely extending integral tension arms.

4. A cable mount in accordance with claim 3, wherein the tension arms further include flanged ends.

5. A cable mount in accordance with claim 4, wherein the flanged ends are transverse to the tension arms and cylindrically shaped.

6. A cable mount in accordance with claim 5, wherein the mounting legs each extend from one of the tension arms.

7. A cable mount in accordance with claim 6, wherein the mounting legs are substantially equidistant from a centerpoint of the body member.

8. A cable mount in accordance with claim 7 wherein the mounting legs become spaced apart a sufficient distance to allow the insertion of a cable tie strap in between as the body member deforms to the second position.

9. A cable mount in accordance with claim 8, wherein the body member includes means for positioning the cable tie between the mounting legs and centrally disposed on the cable mount.

10. A cable mount in accordance with claim 9, wherein the mounting legs extend radially inward from the tension arms towards each other and then bend so as to be parallel to each other but perpendicular to a plane extending through the ends of the tension arms.

11. A cable mount in accordance with claim 10, wherein the securing means comprises a plurality retention barbs formed on non-opposing sides of the mounting legs.

12. A cable mount in accordance with claim 11, wherein the retention barbs are formed as semi-circular disc protrusions.

13. A cable mount in accordance with claim 1, further comprising a planar saddle member disposed on the center of the top side of the body member to provide a support surface for the bundle.

14. A cable mount in accordance with claim 13, wherein the planar saddle member extends laterally across the body member in each direction past where the mounting legs attaches to the body member.

15. A cable mount in accordance with claim 13, further comprising a pair of flexible bent lever support members having a base portion and a lever portion extending from the top side of the body member, wherein one of the bent lever support members is formed on each side of the planar saddle member.

16. A cable mount in accordance with claim 15, wherein each of the bent lever support members is disposed so that the lever portion is inclined away from the planar saddle member.

17. A cable mount in accordance with claim 16, wherein the base portion of each bent lever support member extends vertically from a point on the top side of the body member substantially opposite of where the mounting legs project from the underside of the body member such as to create a leg closing force on the mounting legs of the cable mount.

18. A cable mount in accordance with claim 15, wherein the body member further includes a thinner and narrower central body section.

19. A cable mount in accordance with claim 18, wherein the central body section of the body member extends between the bent lever support members.

* * * * *